United States Patent [19]
Ryan

[11] Patent Number: 5,413,155
[45] Date of Patent: May 9, 1995

[54] AGRICULTURAL FEED BAGGER

[76] Inventor: Kelly P. Ryan, P.O. Box 488, Blair, Nebr. 68008

[21] Appl. No.: 132,483

[22] Filed: Oct. 6, 1993

Related U.S. Application Data

[63] Continuation of Ser. No. 993,963, Dec. 17, 1992, abandoned, which is a continuation of Ser. No. 861,316, Mar. 31, 1992, abandoned, which is a continuation-in-part of Ser. No. 202,107, Jun. 3, 1988, abandoned, which is a continuation-in-part of Ser. No. 155,108, Feb. 11, 1988, abandoned.

[51] Int. Cl.$^6$ ................................................ B65B 1/00
[52] U.S. Cl. ...................................... 141/114; 141/71; 100/100; 100/145; 100/65
[58] Field of Search ........................ 141/10, 12, 71, 73, 141/114, 256, 313, 314; 100/65, 66, 100, 144, 145, 177, 189

[56] References Cited

U.S. PATENT DOCUMENTS

| | | | |
|---|---|---|---|
| 3,687,061 | 8/1972 | Eggenmuller et al. | 100/65 |
| 4,046,068 | 9/1977 | Eggenmuller et al. | 100/65 |
| 4,337,805 | 7/1982 | Johnson et al. | 141/71 |
| 4,484,606 | 11/1984 | Kosters | 141/114 |
| 4,567,820 | 2/1986 | Munsell | 100/65 |
| 4,621,666 | 11/1986 | Ryan | 141/114 |
| 4,653,553 | 3/1987 | Cox et al. | 141/114 |
| 4,672,794 | 6/1987 | Good | 141/114 X |

Primary Examiner—J. Casimer Jacyna
Attorney, Agent, or Firm—Wood, Phillips, VanSanten, Clark & Mortimer

[57] ABSTRACT

An improved agricultural feed bagger wherein the feed compaction rotor is mounted above the bottom portion of the feed receptacle to provide improved compaction of the feed stock within the receptacle space. The rotor may be mounted between one-third and two-thirds of the distance between the top wall and bottom portion of the bagger.

4 Claims, 7 Drawing Sheets

AGRICULTURAL FEED BAGGER

CROSS-REFERENCE TO RELATED APPLICATION

This application is a continuation, of application Ser. No. 07/993,963, filed Dec. 17, 1992, now abandoned, which is a continuation of Ser. No. 07/861,316, filed Mar. 31, 1992, now abandoned, which is a continuation-in-part of Ser. No. 07/202,107, filed Jun. 3, 1988, now abandoned, which is a continuation-in-part of a verified statement claiming small entity status is of record and is still Ser. No. 07/155,108, filed Feb. 11, 1988, now abandoned.

FIELD OF THE INVENTION

This invention relates to an apparatus for loading agricultural feed stock into expansible storage receptacles or agricultural bags and, more particularly, to a structure utilizing a toothed rotor for directing the feed stock into large diameter storage receptacles or bags.

BACKGROUND ART

Horizontally expansible silage storage bags have been commonly used as an alternative to permanent storage structures, such as barns and silos. Such storage bags are desirable from an economic standpoint and are advantageous in that they are easily loaded and the stored material is readily accessible.

A typical feed bagger has an expansible bag, having a closed end braced against a backstop, and an open end which surrounds a feed tunnel supported on a movable carriage. A rotor, with radially extending teeth is mounted adjacent to the feed tunnel and propels feed stock from a supply toward the backstop. As an incident of a pressure buildup from the accumulation of feed stock in the bag, the carriage is urged in a controlled manner away from the backstop to enlarge the storage capacity thereof.

In the prior art devices, the conveyors which supply feed to the rotor do not include means for tumbling the feed so that the feed is evenly supplied to the rotor. Further, in the prior art devices, when a bag has been filled, it is sometimes difficult to clean the tunnel of the bagger.

An additional shortcoming of the prior devices is the inability of the baggers to efficiently compact feed stock within large diameter storage bags. Still another disadvantage of some of the larger prior art devices is that the frames thereof are overly rigid and frequently experience structural damage during transportation of the bagger from one field location to another.

SUMMARY OF THE INVENTION

According to the invention, an improved rotor construction is provided on a mobile carriage having an associated expansible receptacle into which the agricultural feed stock is delivered. The receptacle, in its expanded state, has vertically spaced top and bottom walls. The rotor of this invention is rotatably mounted at the forward end of a tunnel at its opening to a feed hopper provided on the mobile carriage. The invention contemplates that the rotor be mounted so that the axis thereof is located from between one-third to two-thirds between the top and bottom portions of the tunnel and therefore approximately one-third to two-thirds between the top and bottom walls of the receptacle. This arrangement provides for a consistent compaction of feed stock throughout the cross section and length of the receptacle.

A conveyor means is provided on the forward end of the mobile carriage and is designed to deliver the feed stock to the rotor in such a manner so that the feed stock will be uniformly distributed over substantially the entire length of the rotor.

Preferably, the propelled feed stock has an unobstructed path between the rotor teeth, and the space bounded by the receptacle. The feed stock, because of the unobstructed path that it follows and the height of the rotor, is delivered to the upper regions of the receptacle or bag so that the feed stock is pressed evenly into the upper receptacle region and voids at the upper region of the receptacle are minimized.

Overall, the structure accounts for a very uniform and efficient compaction of feed stock in an expansible receptacle.

Another feature of the invention is that the frame supporting the mobile carriage may be locked into a rigid condition when the apparatus is being used to compact feed stock into the bag but which may be manipulated so that the frame will have a certain amount of flex to prevent structural damage to the frame when the apparatus is being moved from one field location to another.

DESCRIPTION OF THE PREFERRED EMBODIMENT

The numeral 10 refers generally to the feed bagger or feed stock bagger of this invention. Bagger 10 includes a frame means or carriage 12 which supports a feed conveyor means 14, tunnel 16, and an associated, expansible feed bag or receptacle 18 which is normally mounted on the tunnel 16 in a folded condition and which is expanded in conventional fashion as feed stock is compressed or forced thereinto. Frame means 12 also supports a hopper means 20 located above a horizontally disposed rotor 22. The hopper means 20 is separated from the forward end of the tunnel 16 by a wall 23, there being a transversely elongated rectangular feed opening in the wall 23 and within which the rotor 22 is mounted.

Figure 5:
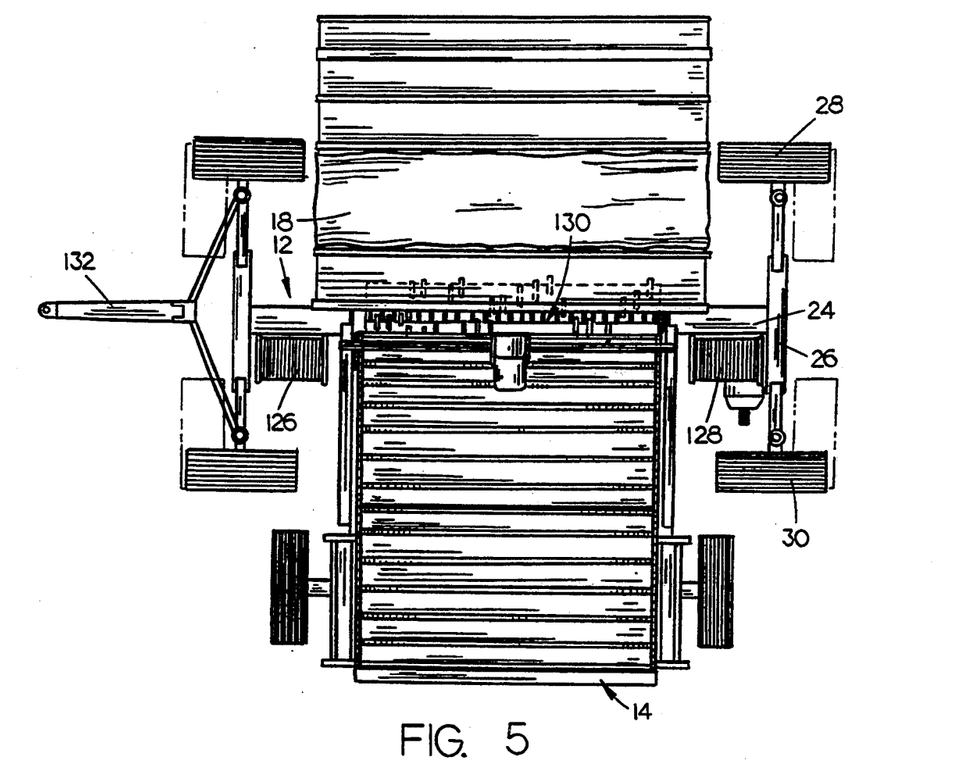
FIG. 5 is a top view of the bagger in its operating position with the transport wheels in the transport position and with the transport wheels being illustrated in broken lines in the operating position.
Figure 6:
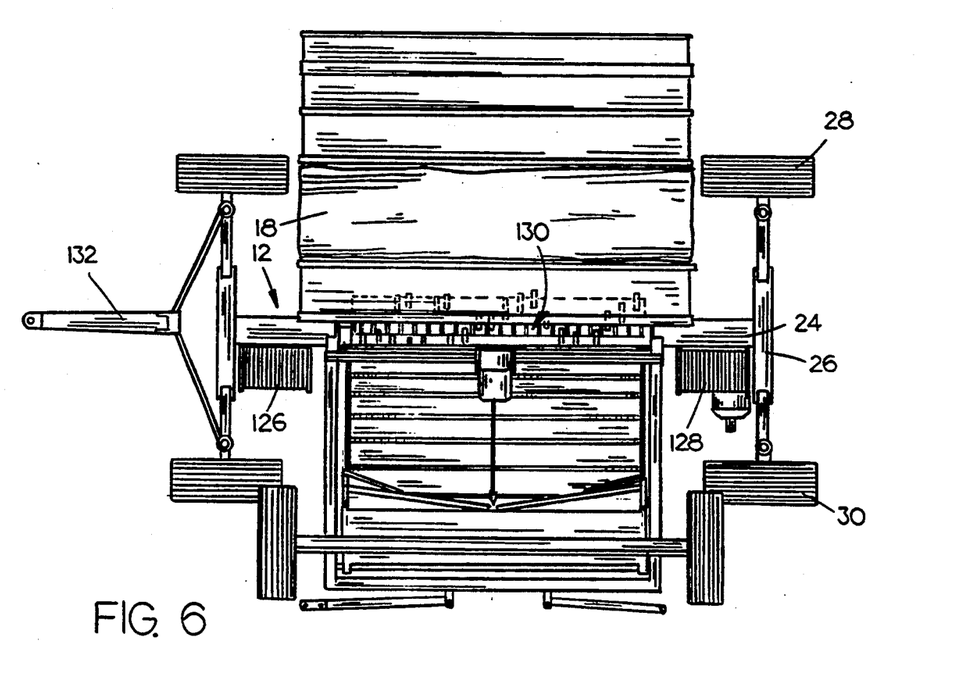
FIG. 6 is a view similar to FIG. 5 except that the conveyor has been raised to its transport position.

Frame means 12 includes a longitudinally extending frame member 24 having a rear frame member or axle 26 mounted at the rearward end thereof as seen in the drawing. A pair of wheels 28 and 30 are suitably rotatably mounted at the opposite ends of the frame member 26 and may be selectively pivotally moved in any convenient fashion from the position illustrated by solid lines in FIG. 5 to the position illustrated by broken lines in FIG. 5. A subframe assembly 32 is secured to and extends upwardly from frame member 24. A longitudinally extending frame member 34 is secured at its rearward end to the sub-frame assembly 32, adjacent one end thereof, and extends forwardly therefrom. As seen in the drawings, frame member 34 is spaced laterally of frame member 24 and is positioned at an elevation above frame member 24. A pair of support braces 36 and 38 are welded or otherwise secured to frame member 34 intermediate the length thereof and extends downwardly therefrom. A horizontally extending brace 40 is secured to the lower ends of braces 36 and 38 and extends laterally therefrom and is secured by welding or the like to the underside of frame member 24. A pair of diagonally extending braces 42 and 44 are also secured at one of their ends to frame member 34 and extend downwardly therefrom in a converging fashion and have their other ends secured by welding or the like to brace 40.

The forward end of frame member 24 is secured to the lower rearward side of an upstanding post or plate 46. Post or plate 48 is spaced forwardly of post 46 and is connected thereto by a top plate 50 and a bottom plate 52.

A transversely extending arm 54 is secured to the inner lower side of post 46 and extends laterally therefrom towards frame member 34. A pair of upstanding posts 56 and 58 extend upwardly from arm 54 and have a horizontally extending brace secured thereto and extending between the upper ends thereof. A diagonally extending brace 62 extends downwardly from one end of brace 60 and is secured to post 46. Post 64 is spaced forwardly of post 58 and is connected thereto by plates 66 and 68 as seen in the drawings.

Pivot block 70 is mounted on the upper surface of arm 54 and has pivot pin 72 secured thereto which extends forwardly therefrom. Front frame member or axle 74 is pivotally secured to pivot pin 72 by any convenient means and extends laterally therefrom through the assemblies 76 and 78 as seen in the drawings. As also seen in the drawings, a pair of apertured ears 80 and 82 extend laterally from posts 46 and 48 respectively and apertured ears 84 and 86 extend laterally from posts 58 and 64. The apertured ears 80 and 82 are adapted to selectively removably receive a pin 88 while the apertured ears 84 and 86 are adapted to selectively removably receive pin 90. When pins 88 and 90 are removed from their respective apertured ears, front frame member 74 may pivot with respect to frame member 24. With the pins 88 and 90 in place, frame member 74 is not permitted to pivot since the pins 88 and 90 are positioned closely adjacent the upper surface of the frame member 74. Wheels 92 and 94 are rotatably mounted on the ends of frame member 74 by any conventional means and may be selectively pivotally moved from the position illustrated by solid lines in FIG. 5 to the position illustrated by broken lines in FIG. 5.

Conveyor means 14 includes an inclined conveyor portion 96 having its upper end 98 positioned above a hopper 100 which extends transversely across the front of the tunnel 16. Conveyor means 96 includes a plurality of conveyor bars 102 which have their opposite ends secured to chains 104 suitably mounted in conventional fashion. An auxiliary conveyor means 106 has its inner end operatively pivotally secured to the lower end of the inclined conveyor means 96 and may be pivotally moved from the inoperative position illustrated in FIG. 1 to the operative position illustrated in FIG. 2. Conveyor 106 also includes a plurality of conveyor bars 108 which have their opposite ends secured to chains 110 which are suitably mounted so that the bars 108 will convey feed inwardly towards the conveyor 96. Conveyor 106 includes a pair of upstanding sideboards 112 and 114 while conveyor means 96 includes a pair of upstanding sideboards 116 and 118. The conveyors 96 and 106 are suitably powered so that feed will be conveyed to the upper end of the hopper 100. Conveyor 106 is provided with a wheel assembly 120 mounted thereon to maintain the conveyor 106 out of ground engagement and to provide a means for supporting the conveyor 106 when the conveyor 106 is in its operative position. Winch 122 is provided for raising and lowering the conveyor 106 with respect to the conveyor 96.

The feed bagger is provided with a pair of conventional cable drum brake assemblies 126 and 128 for controlling the movement of the feed bagger away from the conventional backstop.

Figure 1:
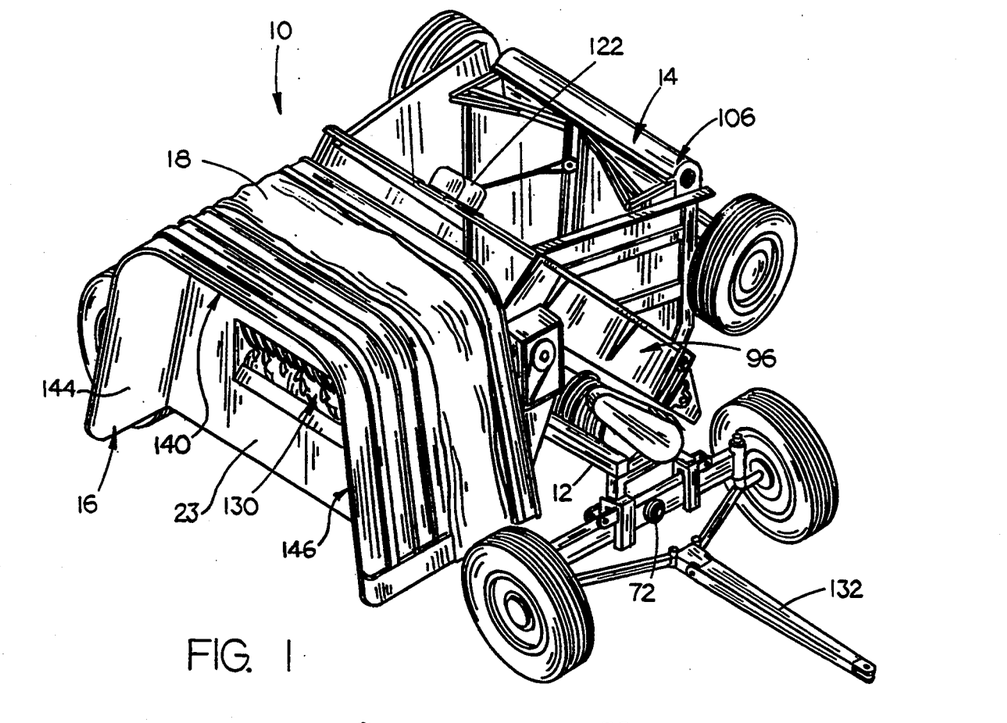
FIG. 1 is a perspective view of the bagger of this invention with the conveyor in its folded condition and the transport wheels in the transport position.
Figure 2:
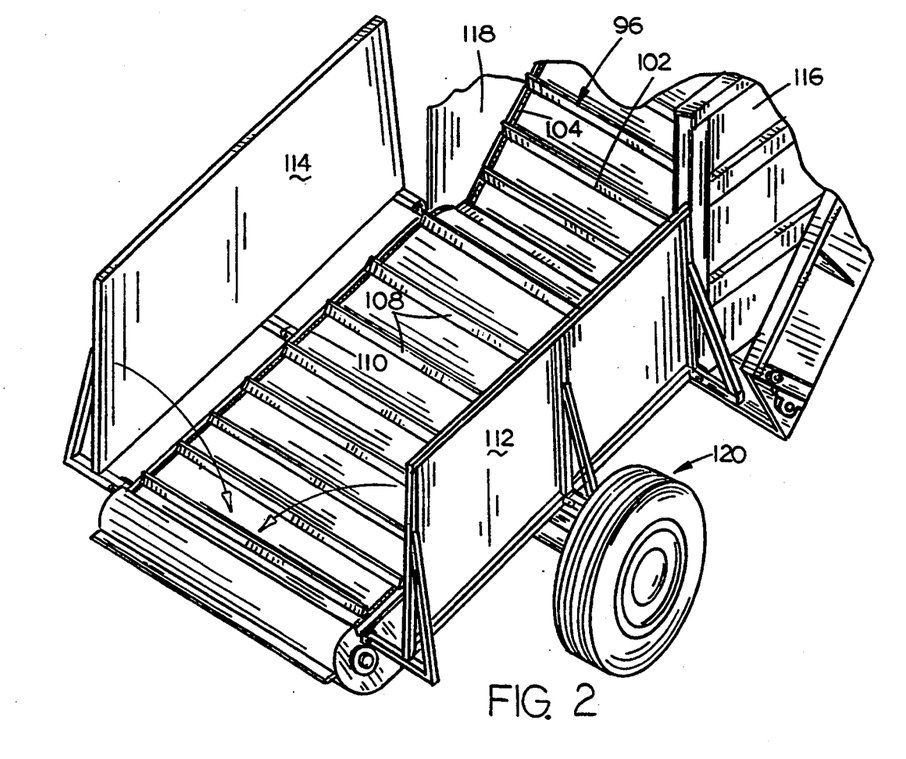
FIG. 2 is a perspective view illustrating the conveyor in its operating position.
Figure 3:
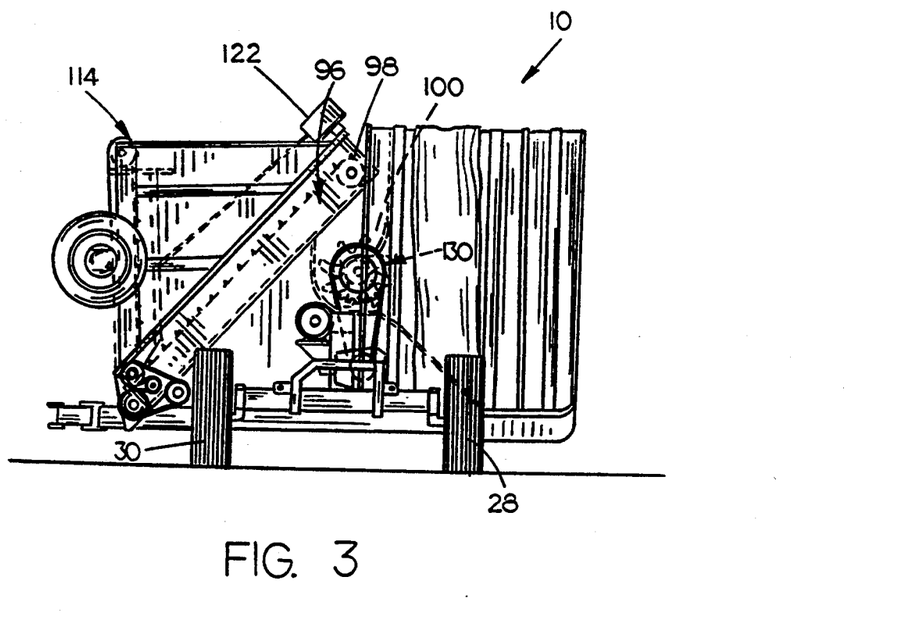
FIG. 3 is a side view of the bagger with the conveyor in its folded transport position.
Figure 4:
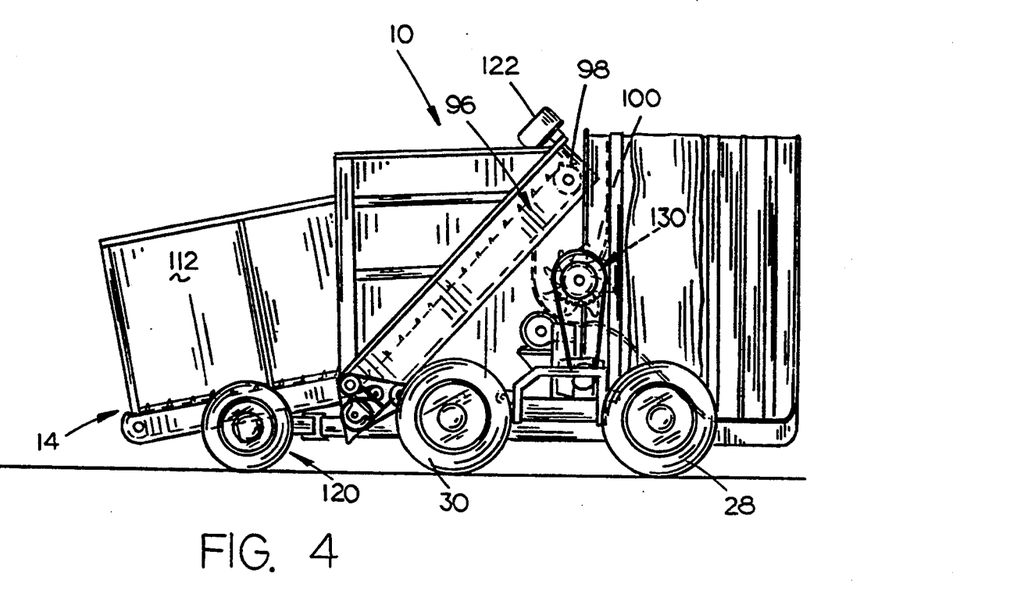
FIG. 4 is a side view similar to FIG. 3 except that the conveyor has been moved downwardly into its operating position.
Figure 7:
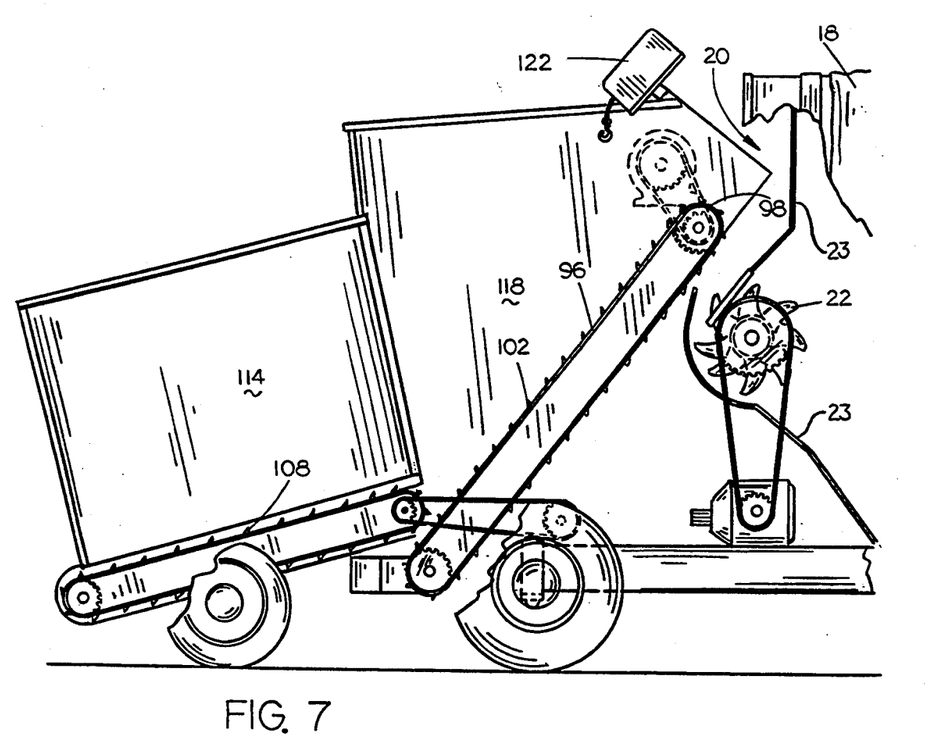
FIG. 7 is a side view of the feed bagger in the operating position with portions thereof cut away to more fully illustrate the invention.
Figure 8:
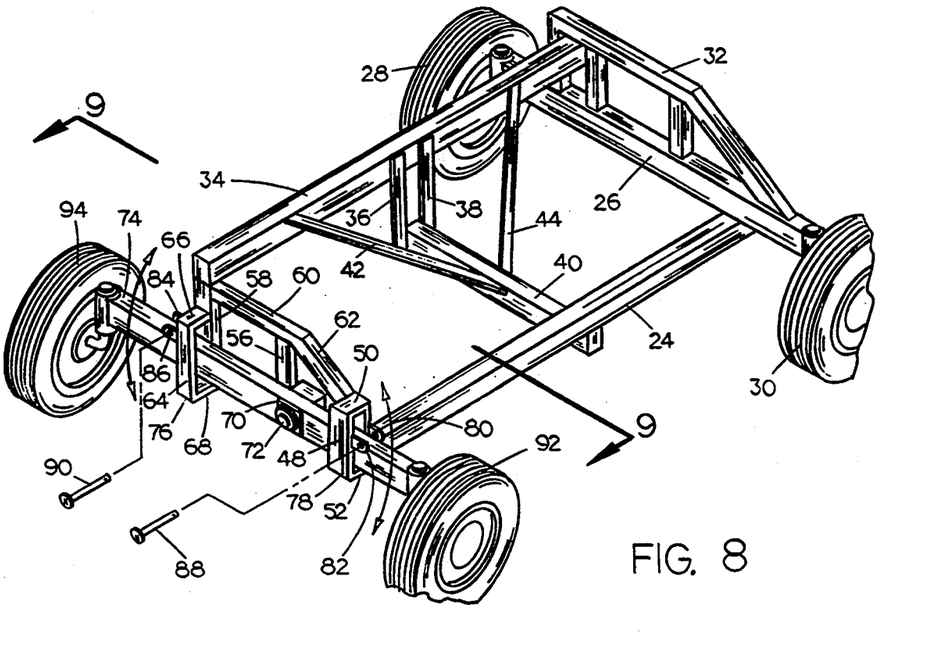
FIG. 8 is a perspective view of the supporting frame of the invention.
Figure 9:
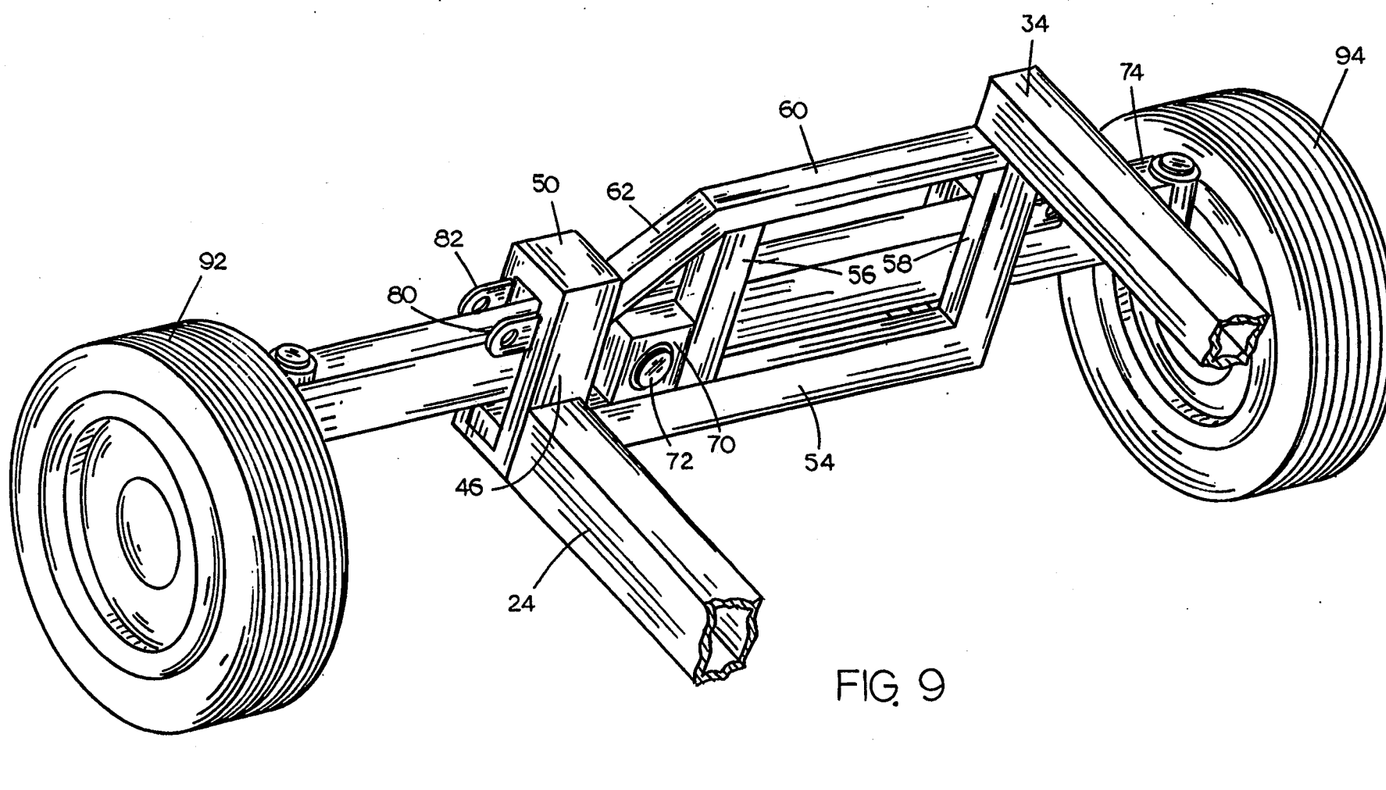
FIG. 9 is an enlarged sectional view seen on lines 9—9 of FIG. 8.

FIGS. 1–9 illustrate the rotor 130 positioned at a height approximately midway between the top wall 140 and bottom portion of the tunnel (the bottom portion of the tunnel 16 being the area between the bottom of the tunnel side walls 144, 146, which defines the bottom of the opening of the bag 18 where secured to the tunnel 16) (see particularly FIGS. 1 and 7). The wall 23 at the forward end of the tunnel 16 extends from the feed opening within which the rotor is mounted to the tunnel top wall 140, side walls 144, 146 and its bottom portion. With respect to FIGS. 1–9, feed rotor 130 extends transversely with respect to the conveying direction of the conveyors and is adapted to convey feed stock into the tunnel 16. The axis of rotation of the feed rotor 130 is at a height approximately midway between the top wall 140 and bottom portion of the feed tunnel 16 so that the rotor 130 will be approximately positioned at a height midway between the upper and lower ends of the bag being filled. The fact that the rotor is located at a height approximately midway between the top wall 140 and bottom portion of the tunnel 16 results in a more even compaction of the feed stock within the bag and requires less power for compaction than if the rotor were mounted at the lower end of the tunnel. In other words, if the rotor is mounted low, the rotor must compress the feed stock all the way from the lower end of the bag to the upper end of the bag. With the rotor located at a height approximately midway between the upper and lower ends of the bag, power consumption is substantially reduced since the force of the gravity assists the compacting action to a great degree. A suitable power means is provided for operating all of the described components on the machine which may either be an internal combustion engine or it could also be driven by the pto (that is, power take off) of a tractor or the like. Hitch 132 is operatively secured to the front frame member 124 so that the feed bagger may be transported from one feed location to another. When it is desired to transport the feed bagger from one location to another, the wheels 28, 30, 92 and 94 would be pivoted so that they were disposed parallel to the longitudinal axis of frame members 24 and 34. In the feed bagging mode, the wheels would be pivoted to the position illustrated by broken lines in FIG. 5. As seen in the drawings, the hitch 132 may be disconnected when the feed bagger is being used to bag feed stock.

Figure 10:
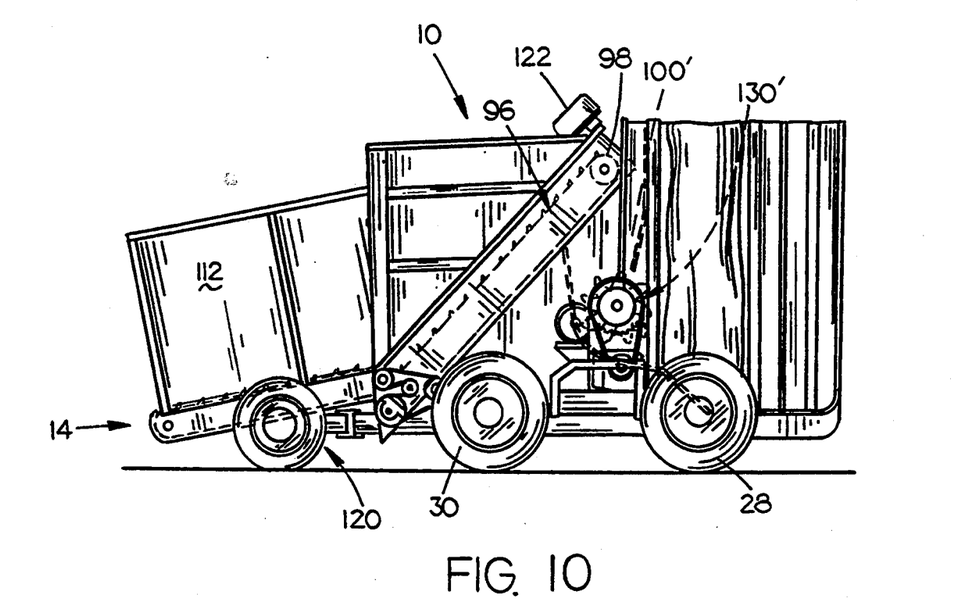
FIG. 10 is a view similar to FIG. 3 except that a modified position of the rotor is illustrated.
Figure 11:
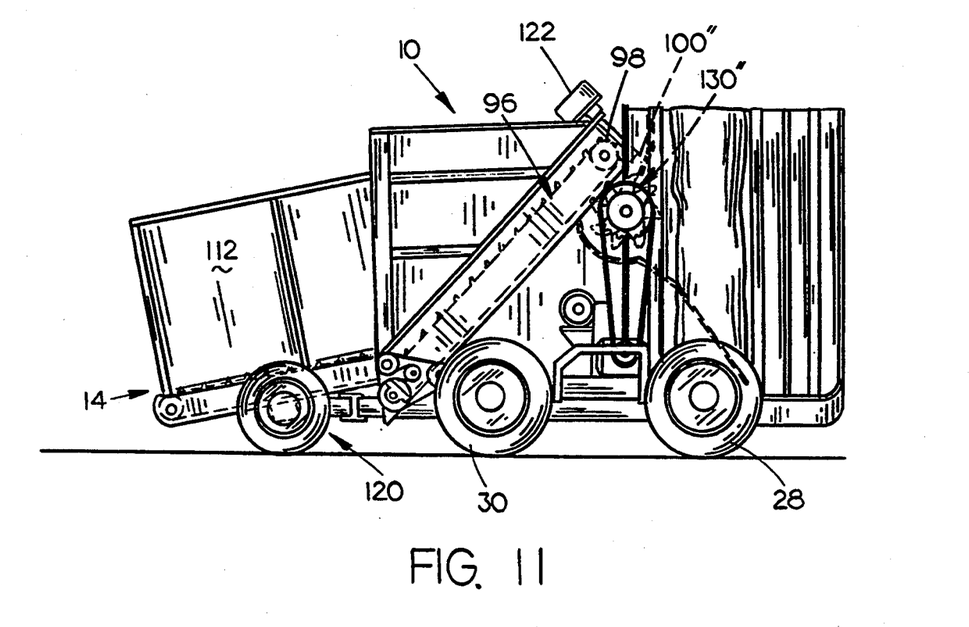
FIG. 11 is a view similar to FIGS. 3 and 10 except that a modified position of the rotor is illustrated.
Figure 12:
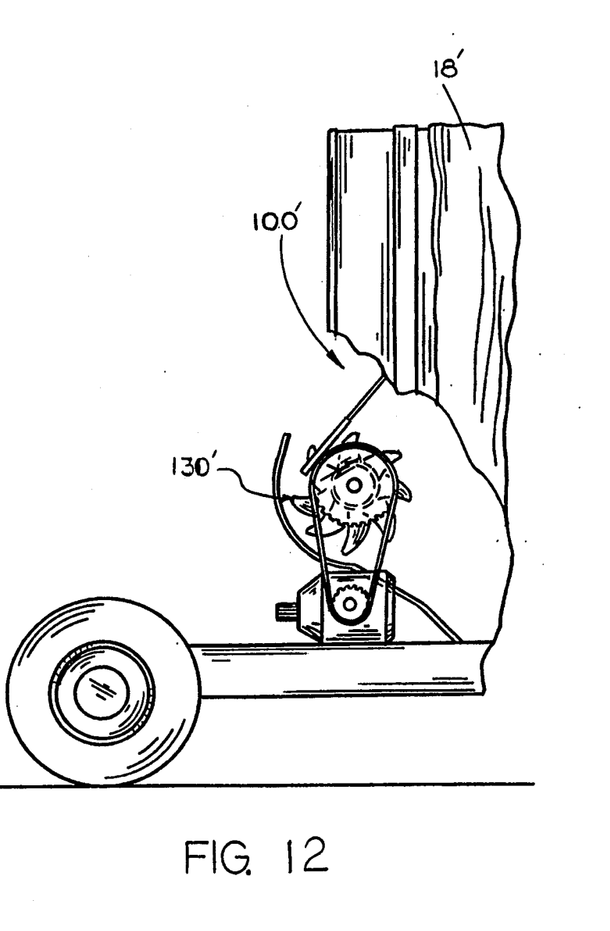
FIG. 12 is a view similar to FIG. 7 except that the modified rotor position of FIG. 10 is illustrated.
Figure 13:
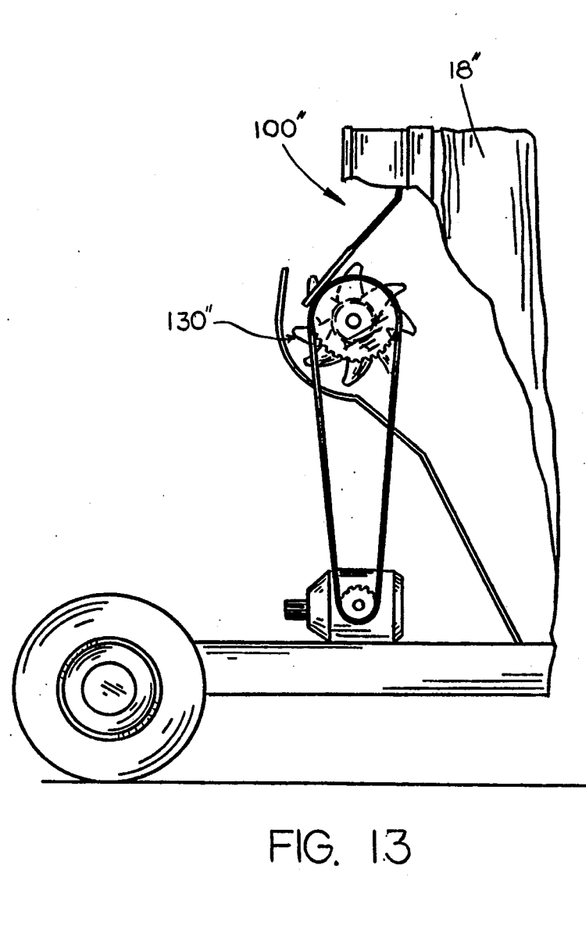
FIG. 13 is a side view similar to FIG. 7 except that the modified rotor position of FIG. 11 is illustrated.

Although the preferred embodiment is to locate the rotor at a height midway between the top wall and bottom portion of the tunnel, FIGS. 10 and 12 and FIGS. 11 and 13 illustrate modified positions of the rotor. In FIGS. 10 and 12, the rotor 130' shown in connection with the hopper 100' is located at a height approximately one-third of the way between the top wall and bottom portion of the tunnel while FIGS. 11 and 13 illustrate the rotor 130" shown in connection with the hopper means 100" located at a height approximately two-thirds of the way between the lower and top wall and bottom portion of the tunnel. Feed bags or receptacles 18', 18" are also shown in FIGS. 12 and 13 respectively. Even though the position of the rotor as illustrated in FIGS. 10 and 12 does not perform as satisfactorily as that illustrated in FIGS. 1–9, the rotor still operates more efficiently than if the rotor is located at a height near the bottom of the tunnel. The embodiment illustrated in FIGS. 11 and 13 also does not function as efficiently as that described in FIGS. 1–9 although superior clean-out results are achieved when the bagging operation has been completed. As the bagger is pulled away from the completed bag, the material tends to fall downwardly from the rotor and eliminates the need for manually cleaning out the tunnel.

The conveyor of this invention is also important in that the material dumped onto the conveyor tends to be evened out or evenly distributed since the flights on the conveyor will only convey as much material as can be positioned forwardly thereof and slightly thereabove. The flights of the conveyor passing through the material on the conveyor tends to even the material so that the same is evenly distributed on the conveyor and evenly distributed or supplied to the rotor.

Thus it can be seen that the invention accomplishes at least all of its stated objectives.

I claim:

1. An improved agricultural feed stock loading apparatus, comprising:

a feed tunnel having forward and rearward ends, said tunnel further having at least a top wall extending between opposite side walls defining a bag opening having a bottom portion extending between the opposite side walls, whereby an expandable agricultural bag with an open end may be secured to said tunnel with the bag open end substantially coinciding with said defined bag opening;

a hopper disposed adjacent the tunnel forward end and communicating with said tunnel through a transversely elongated rectangular feed opening oriented substantially vertically in a wall defining the forward end of the tunnel at a level that is approximately midway between the top wall and bottom portion of said tunnel, said forward end defining walls extending from said feed opening to said top wall, said bottom portion, and said opposite side walls;

a rotor element for propelling feed stock from said hopper into said tunnel and a secured bag, the rotor element consisting essentially of a single rotor rotatable about a horizontal axis at a height that is approximately midway between the top wall and bottom portion of said tunnel; and means for rotating said rotor about said horizontal axis.

2. The apparatus of claim 1, wherein said feed opening is of a width which is substantially less than the spacing between the tunnel opposite side walls.

3. An improved agricultural feed stock loading apparatus, comprising:

a feed tunnel having forward and rearward ends, said tunnel further having at least a top wall extending between opposite side walls defining a bag opening having a bottom portion extending between the opposite side walls, whereby an expandable agricultural bag with an open end may be secured to said tunnel with the bag open end substantially coinciding with said defined bag opening;

a hopper disposed adjacent the tunnel forward end and communicating with said tunnel through a transversely elongated rectangular feed opening oriented substantially vertically in a wall defining the forward end of the tunnel at a height that is no less than one-third of the way up from the bag opening bottom portion to the top wall of said tunnel and no more than two-thirds of the way up from the bag opening bottom portion to the top wall of said tunnel, said forward end defining walls extending from said feed opening to said top wall, said bottom portion, and said opposite side walls;

a rotor element for propelling feed stock from said hopper into said tunnel and a secured bag, the rotor element consisting essentially of a single rotor and having an outer dimension when viewed through an axial plane which is approximately the same size as the feed opening, said rotor being mounted in a position substantially within the feed opening for rotation about a horizontal axis at a height that is no less than one-third of the way up from the bottom portion to the top wall of said tunnel and no more than two-thirds of the way up from the bottom portion to the top wall of said tunnel; and means for rotating said rotor about said horizontal axis.

4. An improved agricultural feed stock loading apparatus, comprising:

a feed tunnel having forward and rearward ends, said tunnel further having at least a top wall extending between opposite side walls defining a bag opening having a bottom portion extending between the opposite side walls, whereby an expandable agricultural bag with an open end may be secured to said tunnel with the bag open end substantially coinciding with said defined bag opening;

a hopper disposed adjacent the tunnel forward end and communicating with said tunnel through a transversely elongated rectangular feed opening oriented substantially vertically in a wall defining the forward end of the tunnel at a level that is approximately midway between the top wall and bottom portion of said tunnel, said forward end defining walls extending from said feed opening to said top wall, said bottom portion, and said opposite side walls;

a rotor element for propelling feed stock from said hopper into said tunnel and a secured bag, the rotor element consisting essentially of a single rotor and having an outer dimension when viewed through an axial plane which is approximately the same size as the feed opening, said rotor being mounted in a position substantially within the feed opening for rotation about a horizontal axis at a height that is approximately midway between the top wall and bottom portion of said tunnel;

means for rotating said rotor about said horizontal axis; and inclined conveyor means having upper and lower ends with the upper end thereof being positioned above the rotor to supply feed to the hopper and the rotor in a direction substantially transverse to the axis of rotation of the rotor.

* * * * *